US006333377B1

(12) United States Patent
Honma et al.

(10) Patent No.: US 6,333,377 B1
(45) Date of Patent: Dec. 25, 2001

(54) INGOT SUPPORT DEVICE FOR SLICING SILICON

(75) Inventors: Hideki Honma, Saitama; Katsuaki Kaneko, Tokyo, both of (JP)

(73) Assignee: A&A Material Corporation, Tokyo (JP)

( * ) Notice: Subject to any disclaimer, the term of this patent is extended or adjusted under 35 U.S.C. 154(b) by 0 days.

(21) Appl. No.: 09/264,236

(22) Filed: Mar. 8, 1999

(51) Int. Cl.[7] ...................................................... C08K 3/30

(52) U.S. Cl. .......................... 524/423; 524/424; 524/425; 524/436; 524/437; 524/492; 524/493; 428/35.7; 428/35.8

(58) Field of Search .................................... 524/437, 423, 524/424, 425, 436, 492, 493; 428/35.7, 35.8

(56) References Cited

U.S. PATENT DOCUMENTS

| | | | | |
|---|---|---|---|---|
| 3,943,190 | * | 3/1976 | Abe et al. | 260/86.1 R |
| 4,188,316 | * | 2/1980 | Sawada | 264/245 |
| 4,592,887 | * | 6/1986 | Bando et al. | 264/337 |
| 4,829,106 | * | 5/1989 | Holoch et al. | 523/506 |
| 4,897,141 | * | 1/1990 | Girard | 156/250 |

* cited by examiner

*Primary Examiner*—Judy M. Reddick
(74) *Attorney, Agent, or Firm*—Sughrue Mion, PLLC

(57) ABSTRACT

An ingot support device for slicing silicon is produced by molding a molding material obtained by blending an acrylic resin or an unsaturated polyester resin and one or more inorganic fillers selected from the group consisting of aluminium hydroxide, barium sulphate, barium carbonate, calcium carbonate and silica. According to the present invention, there is provided an ingot support device for slicing silicon which can be produced easily at a low cost, which has enough strength to cope with the upsizing of the ingot block, has high adhesive properties with the ingot block, and has other further improved properties which are required of the ingot support device for slicing silicon.

6 Claims, 1 Drawing Sheet

INGOT SUPPORT DEVICE FOR SLICING SILICON

BACKGROUND OF THE INVENTION

1. Field of the Invention

The present invention relates to an ingot support device for slicing silicon. In particular, the present invention relates to an ingot support device for slicing silicon having further improved properties and which can be produced at a low cost.

2. Description of the Related Art

Conventionally, silicon wafers have been produced by slicing a single crystal block (ingot block) using piano wire. More particularly, for example, a cylindrical ingot block is mounted on and secured to an ingot support device using an adhesive such as an epoxy resin, and the ingot block is sliced to a desired thickness using piano wire while applying a cutting oil and/or a cutting powder, thereby, producing multiple silicon wafers.

FIG. 2 is an illustration of a prior art ingot support device for slicing silicon. The ingot support device 10 comprises a carbon mounting block 50 to mount and secure an ingot block 3, and an underlying glass base 60. In the production of silicon wafers, the ingot block 3 is secured to the carbon mounting block 50 of the ingot support device using an adhesive, then piano wires 4 are advanced in a fixed direction to cut the ingot block 3 into silicon wafers. At this time, cutting oil and/or cutting powder are applied in order to facilitate the cutting of the ingot block 3. The piano wires 4 cut the carbon mounting block 50 together with the ingot block 3, and when the piano wires 4 reach the glass base 60, it is determined that the cutting of the ingot block 3 is completed, and the cutting process is stopped.

The drawbacks of the above-mentioned conventional ingot support device 10 for slicing silicon are that it is expensive and the production process is complicated because the ingot support device is a composite of the carbon mounting block 50 and the glass base 60. In addition, carbon used for the ingot support device is expensive since it should have high quality. Moreover, the use of the glass base 60 may also present a problem with on-the-job safety due to breakage and the like.

As semiconductor devices have become highly integrated recently, chip area has increased, consequently, the diameters of silicon wafers have also increased. Presently, 8-inch silicon wafers are the main stream, but it is expected that the size will be increased to around 16-inch, for example, in the future. The increase in the diameter of silicon wafers will require the upsizing of the ingot block, and the ingot support device for slicing silicon will correspondingly be required to have increased strength and a larger size to mount and secure such an ingot block.

Accordingly, an object of the present invention is to provide an ingot support device for slicing silicon which can be produced easily at a low cost, which has enough strength to cope with the upsizing of the ingot block, has high adhesive properties with the ingot block, and has other further improved characteristics which are required of the ingot support device for slicing silicon such as oil resistance, insulating properties, a low thermal expansion coefficient, etc.

SUMMARY OF THE INVENTION

As the result of extensive study, the present inventors have been able to solve the above-mentioned conventional problems.

In one aspect of the present invention, there is provided an ingot support device for slicing silicon produced by molding a molding material comprising an acrylic resin and one or more inorganic fillers selected from the group consisting of aluminium hydroxide, barium sulphate, barium carbonate, calcium carbonate and silica.

In another aspect of the present invention, there is provided an ingot support device for slicing silicon produced by molding a molding material comprising an unsaturated polyester resin and one or more inorganic fillers selected from the group consisting of aluminium hydroxide, barium sulphate, barium carbonate, calcium carbonate and silica.

In a further aspect of the present invention, there is provided the ingot support device for slicing silicon in which the blending ratio of the inorganic fillers is 40–85% by weight based on the total amount of the molding material.

In a yet further aspect of the present invention, there is provided the ingot support device for slicing silicon in which the blending ratio of the inorganic fillers is 55–80% by weight based on the total amount of the molding material.

In a still further aspect of the present invention, there is provided the ingot support device for slicing silicon in which the acrylic resin is polymethyl methacrylate resin.

In a still further aspect of the present invention, there is provided the ingot support device for slicing silicon in which the surface roughness of the surface which the silicon ingot is mounted on and secured to is in the range between 10 and 1000 $\mu$m, according to JIS B0601-1982.

In a still further aspect of the present invention, there is provided the ingot support device for slicing silicon in which the surface roughness is 20–200 $\mu$m.

DETAILED DESCRIPTION OF THE INVENTION

Figure 1:
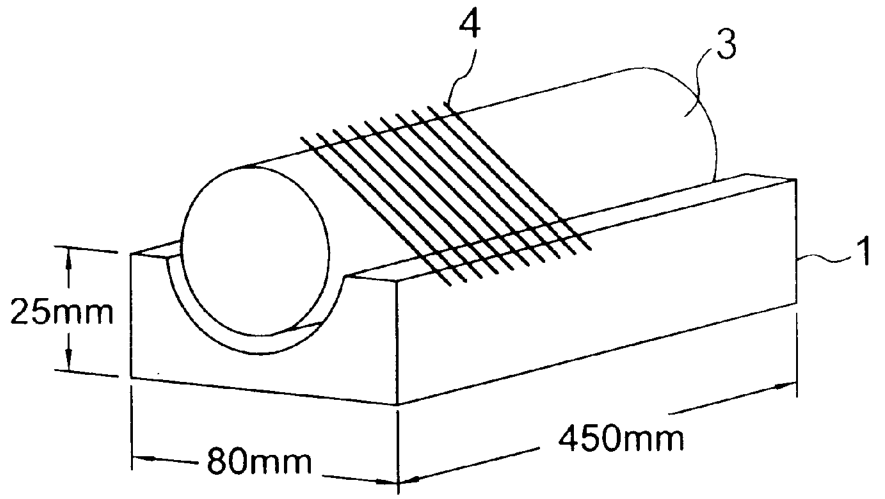
FIG. 1 is an illustration of an ingot support device for slicing silicon according to the present invention.
Figure 2:
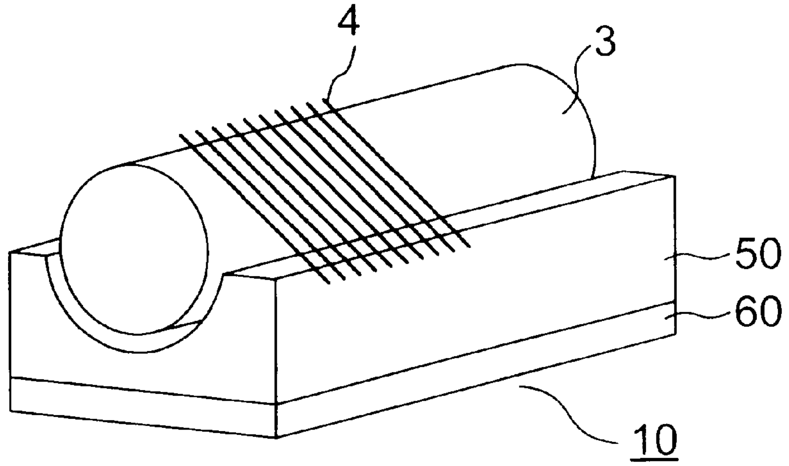
FIG. 2 is an illustration of a prior art ingot support device for slicing silicon.

Examples of the acrylic resins used for the ingot support device for slicing silicon according to the present invention include, for example, a polymer and a copolymer of acrylic acid, acrylic esters, acrylamide, acrylonitrile, methacrylic acid, and methacrylic esters and the like. Among these, polymethyl methacrylate resin is preferably used. In the above-mentioned resins, if necessary, other resins such as amino resins, epoxy resins and isocyanate compounds can be copolymerized or crosslinked in an amount of around 5% based on the total amount.

On the other hand, examples of the unsaturated polyester resins used for the ingot support device for slicing silicon according to the present invention include, for example, resins obtained by polycondensation of $\alpha,\beta$-unsaturated polybasic acid, polyhydric alcohols, saturated polybasic acids and the like, followed by crosslinking with vinyl monomers. Preferable examples of the unsaturated polyester resin include resins obtained by polycondensation of ortho-phthalic acid or isophthalic acid with fumaric acid and ethylene glycol, followed by dissolution in styrene monomers. Unsaturated polyester resins can be blended with other resins or reinforcing fibers (glass fiber and the like) if necessary. For example, urethane resin can be copolymerized or crosslinked therein in an amount of around 5% based on the total amount.:

In the molding material for producing the ingot support device for slicing silicon according to the present invention, the above-mentioned acrylic resin or unsaturated polyester resin is blended with an inorganic filler. Examples of the inorganic filler include aluminium hydroxide, barium sulphate, barium carbonate, calcium carbonate and silica, and they can be used in admixture if necessary.

The above-mentioned inorganic filler can be blended in the granule form, in such a case, the particle size is, for example, 0.1–100 $\mu$m, preferably 0.1–10 $\mu$m.

If the blending ratio of the inorganic filler is too high, the ingot support device for slicing silicon becomes too hard, which makes the cutting and polishing thereof with an ordinary method difficult, and if it is too low, the change in size caused by the temperature change becomes too large, and the dimensional precision of the sliced silicon wafer is deteriorated. Accordingly, the blending ratio of the inorganic filler is 40–85% by weight, preferably 55–80% by weight, more preferably 60–75% by weight based on the total amount of the molding material. When the blending ratio is within this range, the ingot support device for slicing silicon and the silicon wafers have good dimensional stability, and the ingot support device can be produced with good cutting properties and processing properties.

The blending of the inorganic filler can be done by a conventional method of introducing fillers to the resins, such as adding them to heated and melted monomers for polymerization.

Apart from the above-mentioned materials, various known additives can be blended with the molding material.

Also, the ingot support device for slicing silicon according to the present invention has a surface roughness (according to JIS B0601-1982) of the surface which the ingot is mounted on and secured to of 10–1000 $\mu$m, preferably 20–200 $\mu$m. When the surface roughness is within this range, the ingot support device has high adhesive strength with the ingot and good releasablity therefrom and the wafers obtained after processing on the ingot support device are free from warping. That is, an ingot block can be easily released from the ingot support device having a small surface roughness as it has low adhesive strength. On the other hand, when the ingot support device has a large surface roughness it has a high adhesive strength. Nevertheless, since the adhesive layer becomes thick and uneven, the ingot block moves with respect to the ingot support device during the cutting process and the dimensional precision of the resulting silicon wafer is deteriorated.

Although the method of molding the ingot support device for slicing silicon according to the present invention is not particularly limited, it is generally produced by casting and pressing. As the molding material used according to the present invention has good moldability, it can be molded into a planar form or into the form of an ingot support device for slicing silicon and there is no special limitation thereof.

One example of the ingot support device for slicing silicon according to the present invention which is obtained in the above way, is shown in FIG. 1. As seen in FIG. 1, the ingot support device 1 for slicing silicon according to the present invention, is different from the conventional ingot support device 10 for slicing silicon in that it is not a composite, thus, it can be easily manufactured. The raw materials used for the ingot support device 1 for slicing silicon according to the present invention are wide spread and easily available, besides being inexpensive, therefore the total cost can be reduced as well.

As the ingot support device for slicing silicon according to the present invention is made of a molding material comprising an acrylic resin or an unsaturated polyester resin blended with a specific inorganic filler, it has enough strength to cope with the upsizing of the ingot block, has good adhesion with the ingot block, and also shows other further improved properties that are required of the ingot support device, such-as dimensional stability after the cutting process, oil resistance, insulating properties, and a low thermal expansion coefficient. In addition, the ingot support device according to the present invention also has a high heat resistance.

EXAMPLES

The present invention is further illustrated by the following examples.

Example 1

Polymethyl methacrylate resin was blended with aluminium hydroxide (particle size of 0.5 $\mu$m) and subjected to pressure molding, then heated to prepare a molding material. Various physical properties of the molding material were determined. The results are given in Table 1. The aluminium hydroxide was blended in an amount of 50% by weight based on the total amount of the molding material.

Example 2

A process analogous to that of Example 1 was carried out except that the aluminium hydroxide (particle size of 0.5 $\mu$m) was blended in an amount of 75% by weight based on the total amount of the molding material. The results are given in Table 1.

Example 3

Orthophthalic acid and isophthalic acid were subjected to polycondensation with fumaric acid and ethylene glycol, the obtained resin was then dissolved in a styrene monomer, and aluminium hydroxide (particle size of 0.5 $\mu$m) and a catalyst (benzoyl peroxide) were blended therewith and subjected to hot forming to provide a molding material. Various physical properties of the molding material were determined. The results are given in Table 1. The aluminium hydroxide was blended in an amount of 50% by weight based on the total amount of the molding material.

TABLE 1

| Items | Measurement standard | Unit | Example 1 | Example 2 | Example 3 |
|---|---|---|---|---|---|
| Specific gravity | ASTM D-792 | — | 1.8 | 2.0 | 1.8 |
| Water absorption | ASTM D-570 | % | 0.03 | 0.03 | 0.03 |
| Tensile | ASTM | kgf/cm$^2$ | 350 | 300 | 320 |

TABLE 1-continued

| Items | Measurement standard | Unit | Example 1 | Example 2 | Example 3 |
|---|---|---|---|---|---|
| strength | D-638 | | | | |
| Elongation | ASTM D-638 | % | 0.5 | 0.5 | — |
| Bending strength | ASTM D-790 | $kgf/cm^2$ | 550 | 500 | 540 |
| Linear expansion coefficiency | ASTM D-696 | cm/cm ° C. | $3.2 \times 10^{-5}$ | $1.6 \times 10^{-5}$ | $3.0 \times 10^{-5}$ |
| Heat deformation temp. | ASTM D-648 | ° C. | 130 | 140 | 190 |
| Barcol hardness | JIS K6911 | — | 60 | 63 | 45 |

The data in Table 1 shows that the ingot support device for slicing silicon according to the present invention has enough strength to cope with the upsizing of the ingot block, and also has other further improved properties that are required of the ingot support device, such as oil resistance, insulating properties, and a low thermal expansion coefficient, as well as high heat resistance.

Example 4

Polymethyl methacrylate resin was blended with aluminium hydroxide (particle size of 0.5 μm) to prepare a molding material. The aluminium hydroxide was blended in an amount of 50% by weight based on the total amount of the molding material. The obtained molding material was melted and poured into a mold that gives an ingot support device for slicing silicon having the dimensions shown in FIG. 1, and subjected to press molding to give the ingot support devices for slicing silicon shown in FIG. 1. The surface of the ingot support devices for slicing silicon on which the ingot is mounted was finished with sand blasting to give various ingot support devices having surface roughnesses (JIS B0601-1982) ranging from 10 to 20 μm, from 20 to 200 μm and from 200 to 1000 μm. The number of the samples for each range was 300. The ingot support devices were respectively measured for their adhesive strength with the ingot and the product precision. “Adhesive strength” refers to the value of the adhesive strength between the ingot support device for slicing silicon and the ingot measured according to JIS A5905, and “the product precision” refers to the amount of warp of a wafer relative to a horizontal surface after it is cut out from the ingot with a wire saw. The results are given in Table 2.

TABLE 2

| Surface roughness (μm) | Adhesive strength | Product precision |
|---|---|---|
| 10~20 | Good | Very good |
| 20~200 | Very good | Very good |
| 200~1000 | Very good | Good |

Note) “Good” and “Very good” for adhesive strength in the Table 2, mean an adhesive strength of not less than 40 $kg/cm^2$ and less than 60 $kg/cm^2$, and not less than 60 $kg/cm^2$, respectively, and “Good” and “Very good” for production precision mean the amount of warp is 20–50 μm, and less than 20 μm, respectively.

Example 5

The amount of the inorganic filler blended was varied within a certain range, and the resulting molding material was examined for its processability (Barcol hardness) and linear expansion coefficient (ASTM D-696).

Acrylic resins or unsaturated polyester resins were blended with at least one type of inorganic filler selected from aluminium hydroxide, barium sulphate, barium carbonate, calcium carbonate and silica, in an amount shown in Table 3 to prepare molding materials. The above-mentioned physical properties of the molding material were determined and the results are also given in Table 3.

TABLE 3

| Bending ratio of inorganic fillers (%) | Processability | Linear expansion coefficient |
|---|---|---|
| 40~55 | Very good | Good |
| 55~80 | Very good | Very good |
| 80~85 | good | Very good |

Note) The blending ratio of the inorganic filler is represented by % by weight based on the total amount of the molding material. In the Table 3, “Good” and “Very good” for processability mean between 70 and 65, and less than 65 and more than 30 in Barcol hardness (unit $kg/cm^2$), respectively. Cutting requires a special blade when the Barcol hardness exceeds 70, and when it is less than 30, swarf adheres to the blade and stops the rotation thereof. “Good” and “very good” for the linear expansion coefficient mean $4.0–3.2\times10^{-5}$ and less than $3.2\times10^{-5}$, respectively.

The above-mentioned results were confirmed with other inorganic fillers. That the results obtained with acrylic resins and those obtained with unsaturated polyesters were similar was also confirmed.

According to the present invention, there is provided an ingot support device for slicing silicon which can be produced easily at a low cost, which has enough strength to cope with the upsizing of the ingot block, has high adhesive properties with the ingot block, and has other further improved properties which are required of the ingot support device for slicing silicon.

While the invention has been described in detail and with reference to specific embodiments thereof, it will be apparent to one of ordinary skill in the art that various changes and modifications can be made therein without departing from the spirit and scope thereof.

What is claimed is:

1. An ingot support device for slicing silicon produced by molding a molding material comprising an acrylic resin and one or more inorganic fillers selected from the group consisting of aluminum hydroxide, barium sulphate, barium carbonate, calcium carbonate, and silica, wherein the ingot support device has a surface on which a an ingot is mounted on and secured to and the surface roughness of said surface is in the range between 10 and 1000 μm according to JIS B0601-1982.

2. An ingot support device for slicing silicon produced by molding a molding material comprising an unsaturated polyester resin and one or more inorganic fillers selected from the group consisting of aluminium hydroxide, barium sulphate, barium carbonate, calcium carbonate and silica wherein the ingot support device has a surface on which an ingot is mounted on and secured to and the surface roughness of said surface is in the range between 10 and 1000 μm according to JIS B0601-1982.

3. The ingot support device for slicing silicon according to claim 1, in which the blending ratio of the inorganic fillers is 40–85% by weight based on the total amount of the molding material.

4. The ingot support device for slicing silicon according to claim 3, in which the blending ratio of the inorganic fillers is 55–80% by weight based on the total amount of the molding material.

5. The ingot support device for slicing silicon according to claim 1, in which the acrylic resin comprises polymethyl methacrylate resin.

6. The ingot support device for slicing silicon according to claim 1, in which the surface roughness is 20–200 μm.

* * * * *